US008868486B2

(12) United States Patent
Tamayo

(10) Patent No.: US 8,868,486 B2
(45) Date of Patent: Oct. 21, 2014

(54) TIME-SENSITIVE CUBE

(71) Applicant: Palantir Technologies, Inc., Palo Alto, CA (US)

(72) Inventor: Juan Tamayo, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/102,394

(22) Filed: Dec. 10, 2013

(65) Prior Publication Data

US 2014/0279824 A1     Sep. 18, 2014

Related U.S. Application Data

(60) Provisional application No. 61/789,225, filed on Mar. 15, 2013.

(51) Int. Cl.
  *G06F 17/00*     (2006.01)
  *G06F 17/20*     (2006.01)
  *G06F 17/30*     (2006.01)

(52) U.S. Cl.
  CPC .... *G06F 17/30592* (2013.01); *G06F 17/30572* (2013.01)
  USPC .......................................... 707/603; 715/212

(58) Field of Classification Search
  CPC ................................................ G06F 17/30592
  See application file for complete search history.

(56) References Cited

U.S. PATENT DOCUMENTS

| | | | |
|---|---|---|---|
| 5,329,108 A | 7/1994 | Lamoure | |
| 5,632,009 A | 5/1997 | Rao et al. | |
| 5,670,987 A | 9/1997 | Doi et al. | |
| 5,845,300 A | 12/1998 | Comer | |
| 6,057,757 A | 5/2000 | Arrowsmith et al. | |
| 6,161,098 A | 12/2000 | Wallman | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,369,835 B1 | 4/2002 | Lin | |

(Continued)

FOREIGN PATENT DOCUMENTS

| EP | 1 672 527 | 6/2006 |
|---|---|---|
| EP | 2 551 799 | 1/2013 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Tarek Chbouki
(74) *Attorney, Agent, or Firm* — Knobbe, Martens, Olson & Bear, LLP

(57) ABSTRACT

A time-sensitive cube data system is disclosed in which time-sensitive and/or time-series data objects are output in response to a user's operations on a time-sensitive OLAP cube. The time-sensitive and/or time-series data objects output by the time-sensitive cube data system may be displayed to the user in any way that may be advantageous to the user's understanding. The time-series objects output by the time-sensitive cube data system are more helpful than a single snapshot, as a user is able to see data trends over time.

17 Claims, 7 Drawing Sheets

(56) References Cited

U.S. PATENT DOCUMENTS

| | | |
|---|---|---|
| 6,549,944 B1 | 4/2003 | Weinberg et al. |
| 6,581,068 B1 | 6/2003 | Bensoussan et al. |
| 6,631,496 B1 | 10/2003 | Li et al. |
| 6,714,936 B1 | 3/2004 | Nevin, III |
| 6,775,675 B1 | 8/2004 | Nwabueze et al. |
| 6,839,745 B1 | 1/2005 | Dingari et al. |
| 6,976,210 B1 | 12/2005 | Silva et al. |
| 6,985,950 B1 | 1/2006 | Hanson et al. |
| 7,036,085 B2 | 4/2006 | Barros |
| 7,139,800 B2 | 11/2006 | Bellotti et al. |
| 7,158,878 B2 | 1/2007 | Rasmussen et al. |
| 7,171,427 B2 * | 1/2007 | Witkowski et al. ............ 1/1 |
| 7,278,105 B1 | 10/2007 | Kitts |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,716,077 B1 | 5/2010 | Mikurak |
| 7,725,547 B2 | 5/2010 | Albertson et al. |
| 7,770,100 B2 | 8/2010 | Chamberlain et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,920,963 B2 | 4/2011 | Jouline et al. |
| 7,962,281 B2 | 6/2011 | Rasmussen et al. |
| 7,962,848 B2 | 6/2011 | Bertram |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,145,703 B2 | 3/2012 | Frishert et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,290,942 B2 | 10/2012 | Jones et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 * | 5/2013 | Ahuja et al. ............ 707/607 |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,689,108 B1 | 4/2014 | Duffield et al. |
| 8,713,467 B1 | 4/2014 | Goldenberg et al. |
| 8,799,799 B1 | 8/2014 | Cervelli et al. |
| 2001/0021936 A1 | 9/2001 | Bertram |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2003/0028560 A1 | 2/2003 | Kudrolli et al. |
| 2003/0144868 A1 | 7/2003 | MacIntyre et al. |
| 2003/0200217 A1 | 10/2003 | Ackerman |
| 2003/0225755 A1 | 12/2003 | Iwayama et al. |
| 2004/0085318 A1 | 5/2004 | Hassler et al. |
| 2004/0095349 A1 | 5/2004 | Bito et al. |
| 2004/0181554 A1 | 9/2004 | Heckerman et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0180330 A1 | 8/2005 | Shapiro |
| 2005/0182793 A1 | 8/2005 | Keenan et al. |
| 2006/0026170 A1 | 2/2006 | Kreitler et al. |
| 2006/0045470 A1 | 3/2006 | Poslinski et al. |
| 2006/0074866 A1 | 4/2006 | Chamberlain et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0271277 A1 | 11/2006 | Hu et al. |
| 2007/0011150 A1 | 1/2007 | Frank |
| 2007/0016363 A1 | 1/2007 | Huang et al. |
| 2007/0078832 A1 | 4/2007 | Ott et al. |
| 2007/0174760 A1 | 7/2007 | Chamberlain et al. |
| 2007/0192265 A1 | 8/2007 | Chopin et al. |
| 2007/0266336 A1 | 11/2007 | Nojima et al. |
| 2007/0294643 A1 | 12/2007 | Kyle |
| 2008/0040684 A1 | 2/2008 | Crump |
| 2008/0077597 A1 | 3/2008 | Butler |
| 2008/0077642 A1 | 3/2008 | Carbone et al. |
| 2008/0104019 A1 | 5/2008 | Nath |
| 2008/0195608 A1 | 8/2008 | Clover |
| 2008/0222295 A1 | 9/2008 | Robinson et al. |
| 2008/0263468 A1 | 10/2008 | Cappione et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0027418 A1 | 1/2009 | Maru et al. |
| 2009/0076845 A1 | 3/2009 | Bellin et al. |
| 2009/0119309 A1 * | 5/2009 | Gibson et al. ............ 707/100 |
| 2009/0132953 A1 | 5/2009 | Reed et al. |
| 2009/0144262 A1 | 6/2009 | White et al. |
| 2009/0164934 A1 | 6/2009 | Bhattiprolu et al. |
| 2009/0171939 A1 | 7/2009 | Athsani et al. |
| 2009/0222400 A1 | 9/2009 | Kupershmidt et al. |
| 2009/0281839 A1 * | 11/2009 | Lynn et al. ............ 705/3 |
| 2009/0287470 A1 | 11/2009 | Farnsworth et al. |
| 2009/0292626 A1 | 11/2009 | Oxford |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070897 A1 | 3/2010 | Aymeloglu et al. |
| 2010/0122152 A1 | 5/2010 | Chamberlain et al. |
| 2010/0198684 A1 | 8/2010 | Eraker et al. |
| 2010/0199225 A1 | 8/2010 | Coleman et al. |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0321399 A1 | 12/2010 | Ellren et al. |
| 2010/0325581 A1 | 12/2010 | Finkelstein et al. |
| 2011/0047159 A1 | 2/2011 | Baid et al. |
| 2011/0060753 A1 * | 3/2011 | Shaked et al. ............ 707/769 |
| 2011/0061013 A1 | 3/2011 | Bilicki et al. |
| 2011/0074811 A1 | 3/2011 | Hanson et al. |
| 2011/0167105 A1 | 7/2011 | Ramakrishnan et al. |
| 2011/0170799 A1 | 7/2011 | Carrino et al. |
| 2011/0208724 A1 | 8/2011 | Jones et al. |
| 2011/0291851 A1 | 12/2011 | Whisenant |
| 2011/0310005 A1 | 12/2011 | Chen et al. |
| 2012/0019559 A1 | 1/2012 | Siler et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0144335 A1 | 6/2012 | Abeln et al. |
| 2012/0159307 A1 | 6/2012 | Chung et al. |
| 2012/0196558 A1 | 8/2012 | Reich et al. |
| 2012/0208636 A1 | 8/2012 | Feige |
| 2012/0221580 A1 | 8/2012 | Barney |
| 2012/0246148 A1 | 9/2012 | Dror |
| 2012/0290879 A1 | 11/2012 | Shibuya et al. |
| 2012/0323888 A1 | 12/2012 | Osann, Jr. |

(56) References Cited

U.S. PATENT DOCUMENTS

| | | | |
|---|---|---|---|
| 2012/0330973 | A1 | 12/2012 | Ghuneim et al. |
| 2013/0046842 | A1 | 2/2013 | Muntz et al. |
| 2013/0061169 | A1 | 3/2013 | Pearcy et al. |
| 2013/0073377 | A1 | 3/2013 | Heath |
| 2013/0097482 | A1 | 4/2013 | Marantz et al. |
| 2013/0176321 | A1 | 7/2013 | Mitchell et al. |
| 2013/0179420 | A1 | 7/2013 | Park et al. |
| 2013/0224696 | A1 | 8/2013 | Wolfe et al. |
| 2013/0238616 | A1 | 9/2013 | Rose et al. |
| 2013/0262527 | A1 | 10/2013 | Hunter et al. |
| 2013/0268520 | A1 | 10/2013 | Fisher et al. |
| 2013/0282696 | A1 | 10/2013 | John et al. |
| 2013/0290011 | A1* | 10/2013 | Lynn et al. ............... 705/2 |
| 2013/0290825 | A1 | 10/2013 | Arndt et al. |
| 2014/0019936 | A1 | 1/2014 | Cohanoff |
| 2014/0032506 | A1* | 1/2014 | Hoey et al. ............ 707/691 |
| 2014/0033010 | A1 | 1/2014 | Richardt et al. |
| 2014/0068487 | A1 | 3/2014 | Steiger et al. |
| 2014/0108380 | A1 | 4/2014 | Gotz et al. |
| 2014/0108985 | A1 | 4/2014 | Scott et al. |
| 2014/0157172 | A1 | 6/2014 | Peery et al. |

FOREIGN PATENT DOCUMENTS

| | | |
|---|---|---|
| WO | WO 2005/104736 | 11/2005 |
| WO | WO 2009/061501 | 5/2009 |
| WO | WO 2010/030913 | 3/2010 |

OTHER PUBLICATIONS

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticies/J2SE/Desktop/javase6/modality/ Jan. 2006, pp. 8.

Bugzilla@Mozilla, "Bug 18726—[feature] Long-click means of invoking contextual menus not supported," http://bugzilla.mozilla.org/show_bug.cai?id=18726 printed Jun. 13, 2013 in 11 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Griffith, Daniel A., "A Generalized Huff Model," Geographical Analysis, Apr. 1982, vol. 14, No. 2, pp. 135-144.

Hibbert et al., "Prediction of Shopping Behavior Using a Huff Model Within a GIS Framework," Healthy Eating in Context Mar. 18, 2011, pp. 16.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Manske, "File Saving Dialogs," http://www.mozilia.org/editor/ui_specs/FileSaveDialogs.html, Jan. 20, 1999, pp. 7.

Map of San Jose, CA. Retrieved Oct. 2, 2013 from http://maps.google.com.

Map of San Jose, CA. Retrieved Oct. 2, 2013 from http://maps.bing.com.

Map of San Jose, CA. Retrieved Oct. 2, 2013 from http://maps.yahoo.com.

Microsoft Office—Visio, "About connecting shapes," http://office.microsoft.com/en-us/visio-help/about-connecting-shapes-HP0850369.aspx printed Aug. 4, 2011 in 6 pages.

Microsoft Office-Visio, "Add and glue connectors with the Connector tool," http://office.microsoft.com/en-us/visio-help/add-and-glue-connectors-with-the-conector-tool-HA010048532.aspx.?CTT=1 printed Aug. 4, 2011 in 1 page.

International Search Report and Written Opinion in Application No. PCT/US2009/056703, dated Mar. 15, 2010.

Rouse, Margaret, "OLAP Cube," http://searchdatamanagement.techtarget.com/definition/OLAP-cube, Apr. 28, 2012, pp. 16.

Official Communication in European Application No. EP 14158861.6 dated Jun. 16, 2014.

"A Quick Guide to UniProtKB Swiss-Prot & TrEMBL," Sep. 2011, pp. 2.

Bluttman et al., "Excel Formulas and Functions for Dummies," 2005, Wiley Publishing, Inc., pp. 280, 284-286.

Canese et al., "Chapter 2: PubMed: The Bibliographic Database," The NCBI Handbook, Oct. 2002, pp. 1-10.

Conner, Nancy, "Google Apps: The Missing Manual," Sharing and Collaborating on Documents, May 1, 2008, pp. 93-97, 106-113 & 120-121.

Delcher et al., "Identifying Bacterial Genes and Endosymbiont DNA with Glimmer," BioInformatics, vol. 23, No. 6, 2007, pp. 673-679.

Goswami, Gautam, "Quite Writly Said!" One Brick at a Time, Aug. 21, 2005, pp. 7.

Kitts, Paul, "Chapter 14: Genome Assembly and Annotation Process," The NCBI Handbook, Oct. 2002, pp. 1-21.

Madden, Tom, "Chapter 16: The Blast Sequence Analysis Tool," The NCBI Handbook, Oct. 2002, pp. 1-15.

Manno et al., "Introducing Collaboration in Single-user Applications through the Centralized Control Architecture," 2010, pp. 10.

Mizrachi, Ilene, "Chapter 1: GenBank: The Nuckeotide Sequence Database," The NCBI Handbook, Oct. 2002, pp. 1-14.

Official Communication in New Zealand Application No. 622517 dated Apr. 3, 2014.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

"The FASTA Program Package," fasta—36.3.4, Mar. 25, 2011, pp. 29.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.

Official Communication in New Zealand Application No. 624557 dated May 14, 2014.

* cited by examiner

TIME-SENSITIVE CUBE

TECHNICAL FIELD

The present disclosure relates to systems and techniques for data integration, analysis, and visualization. More specifically, the present disclosure relates to integration, analysis, and visualization of time-series and/or time-sensitive data objects.

BACKGROUND

Relational database management systems (RDBMSs) have typically been used with databases having traditional data types that are easily structured into tables storing transactional information. RDBMSs, however, have significant limitations when it comes to processing and querying multidimensional data. Comparatively, Online Analytical Processing (OLAP) systems enable fast querying of multidimensional data. OLAP system functionality may be characterized by dynamic multi-dimensional analysis of data. Some OLAP systems may support end user analytical and navigational activities. OLAP systems provide snapshots of data values in response to multi-dimensional queries.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a computer-implemented method of providing multi-dimensional time series objects to a user is disclosed that may comprise: providing an electronic database configured to store a plurality of time-series objects including one or more time-series metric objects and a plurality of dimension objects; generating, by a computing system including one or more hardware computer processors, based at least in part on the plurality of time-series objects, a time-sensitive OLAP cube; receiving, via an input device of the computing system, an operation from a user comprising a selection of at least two of the plurality of dimension objects; determining, by the computing system, based on the received operation, one or more relevant time-series metric objects; and providing, on an electronic display of the computing system, the relevant time-series metric objects to the user.

According to another aspect, providing the relevant time-series metric objects to the user may comprise: outputting, on the electronic display of the computing system, a user interface including the relevant time-series metric objects in at least one of a two-dimensional way and a three-dimensional way.

According to yet another aspect, each of the plurality of dimension objects may include one or more characteristics.

According to another aspect, the one or more characteristics may be structured hierarchically.

According to yet another aspect, the received operation may further comprise a selection of at least one of the one or more characteristics.

According to another aspect, the computer-implemented method may further comprise: providing, on the electronic display of the computing system, an interface configured to allow the user to manipulate the time-sensitive OLAP cube and provide operations.

According to yet another aspect, the computer-implemented method may further comprise: receiving an expression from the user; and applying the received expression to the relevant time-series metric objects.

According to another embodiment, a computer system is disclosed that may comprise: one or more hardware processors in communication with a computer readable medium storing software modules including instructions that are executable by the one or more hardware processors in order to cause the computer system to: access, from an electronic data store, a plurality of time-sensitive objects including measures and dimensions; generate, based at least in part on the accessed plurality of time-sensitive objects, a time-sensitive OLAP cube; receive one or more OLAP operations; and apply the received one or more OLAP operations to the time-sensitive OLAP cube and output calculated time-sensitive objects based at least in part on the OLAP operations.

According to an aspect, the software modules may be further executable by the one or more hardware processors in order to cause the computer system to: output, on an electronic display, a user interface including the calculated time-sensitive objects in at least one of a two-dimensional way and a three-dimensional way.

According to another aspect, at least one of the measures may be time-sensitive.

According to yet another aspect, the one or more OLAP operations may include a selection of at least one dimension.

According to another aspect, each dimension may include one or more characteristics.

According to yet another aspect, the one or more characteristics may be structured hierarchically.

According to another aspect, the one or more OLAP operations may include a selection of at least one of the one or more characteristics.

According to yet another aspect, the software modules may be further executable by the one or more hardware processors in order to cause the computer system to: provide a computer interface configured to allow a user to manipulate the time-sensitive OLAP cube and provide OLAP operations.

According to another aspect, the software modules may be further executable by the one or more hardware processors in order to cause the computer system to: apply one or more mathematical expressions to the calculated time-sensitive objects.

According to yet another aspect, the one or more OLAP operations may include at least one of drill up, drill down, roll up, pivot, slice, or dice.

According to yet another embodiment, a computer system is disclosed that may comprise: an electronic database configured to store a plurality of time-series objects and a time-series OLAP cube based at least in part on one or more of the plurality of time-series objects; and one or more hardware processors in communication with the electronic database and a computer readable medium storing software modules including instructions that are executable by the one or more hardware processors in order to cause the computer system to: access the stored time-series OLAP cube; present, on an electronic display, the time-series OLAP cube; receive user-provided indications of operations to be applied to the presented time-series OLAP cube; apply operations corresponding to the user-provided indications to the time-series OLAP cube; and present, on the electronic display, determined time-series objects based at least in part on the applied operations.

According to an aspect, the time-series objects may include one or more time-series metric objects and a plurality of dimension objects.

According to another aspect, the operations may include at least one of drill up, drill down, roll up, pivot, slice, or dice.

DETAILED DESCRIPTION OF SPECIFIC EMBODIMENTS

Overview

In general, a time-sensitive cube data system is disclosed in which time-sensitive and/or time-series data objects are output in response to a user's operations on a time-sensitive OLAP cube. The time-sensitive and/or time-series data objects output by the time-sensitive cube data system may be displayed to the user in any way that may be advantageous to the user's understanding. Advantageously, the time-series objects output by the time-sensitive cube data system are more helpful than a single snapshot, as a user is able to see data trends over time. An example of one possible display is shown in FIG. 1, which is described in detail below.

Figure 4:
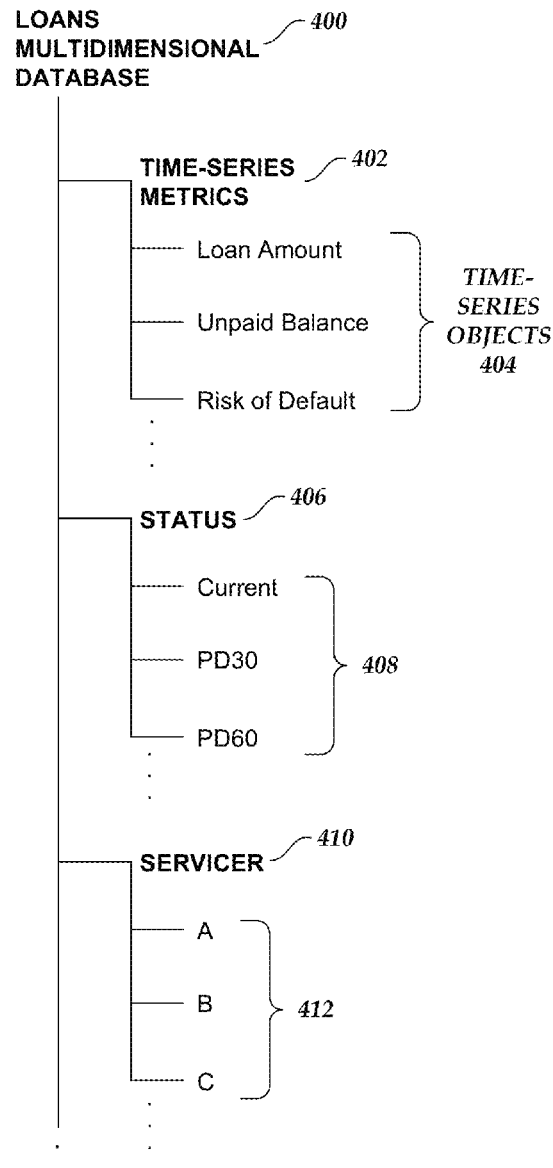
Figure 5:
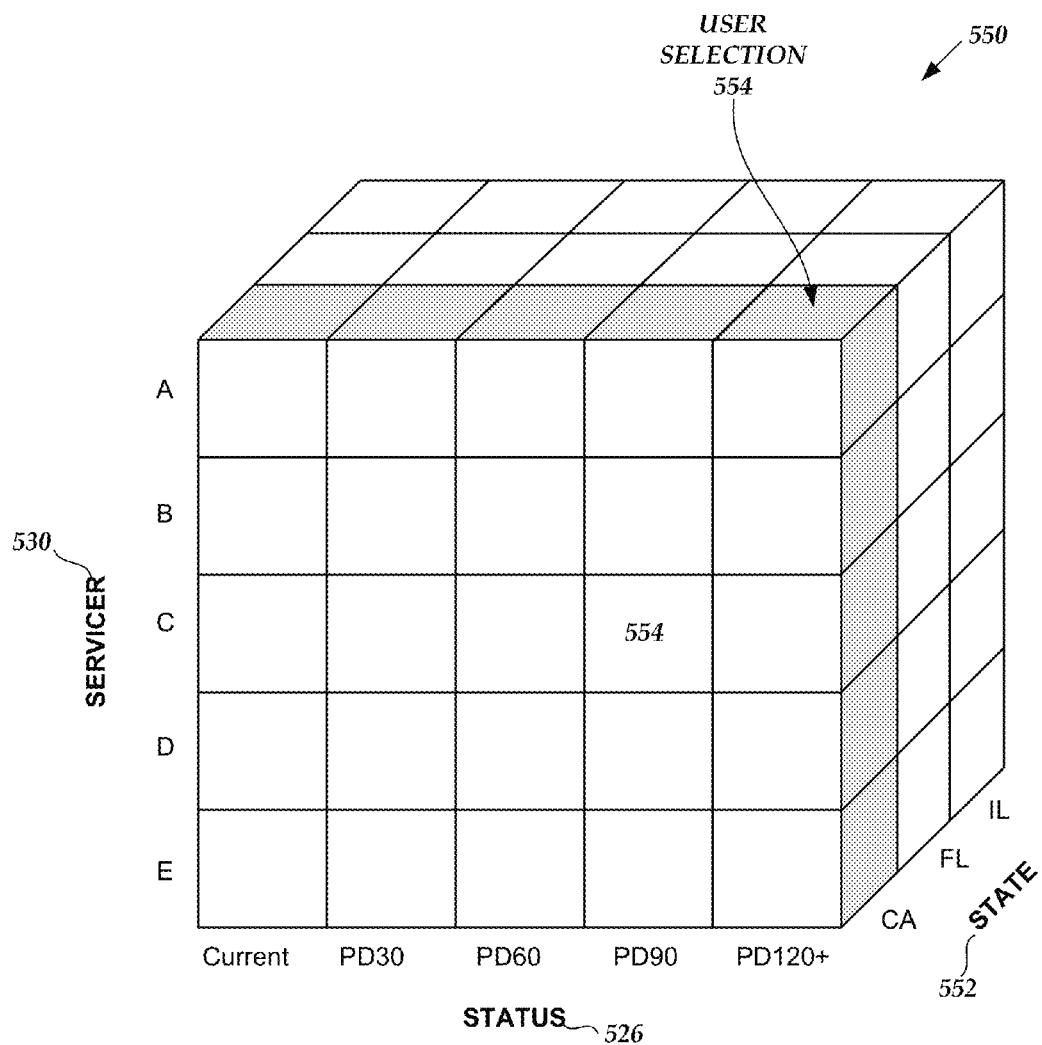
FIG. 5 illustrates an example visual representation of the multidimensional database of the time-sensitive cube data system, according to an embodiment of the present disclosure.

In an embodiment, the time-sensitive cube data system accesses time series objects and/or other types of data stored in a multidimensional database. Examples of such a database may be found in FIGS. 3 and 4. The multidimensional database may comprise a time-sensitive OLAP cube, or a time-sensitive OLAP cube may be generated from the dataset of the multidimensional database. An example visual representation of a time-sensitive OLAP cube generated from the dataset of FIG. 4 is shown in FIG. 5. A time-sensitive OLAP cube may include any number of data dimensions and data metrics. A user of the time-sensitive cube data system may perform operations on the time-sensitive OLAP cube, such as slicing. The operations performed on the time-sensitive OLAP cube result in the output of time-series data objects. The information contained in the time-series data objects may be displayed to the user in any way that is helpful to the user in conceptualizing and understanding the data. The output may, for example, be presented to the user via a computer user interface.

Figure 1:
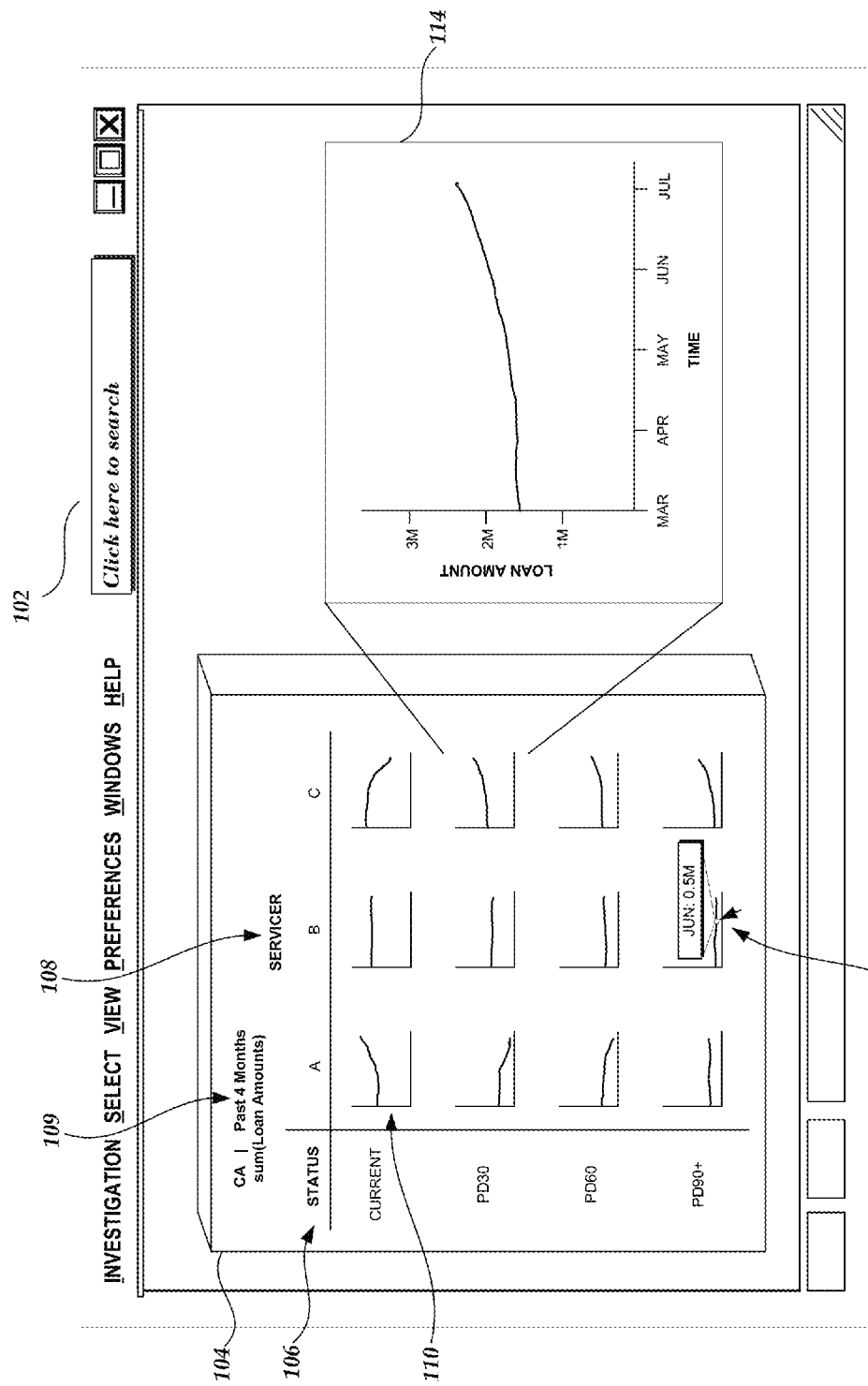
FIG. 1 illustrates a user interface of a time-sensitive cube data system, according to an embodiment of the present disclosure.

FIG. 1 illustrates an example user interface 102 of the time-sensitive cube data system, according to an embodiment of the present disclosure. FIG. 1, as well as certain other figures, illustrate data related to loan statuses and servicers; however, this particular data type is used for illustration only. The features discussed with references to loan data are also applicable and usable with any other type of data.

The user interface 102 of FIG. 1 may be shown when, for example, the user of the time-sensitive cube data system selects the California slice 554 of the time-sensitive OLAP cube 550 of FIG. 5. The user interface 102 includes a time-series object display 104, which displays the results of the slice operation on the time-sensitive OLAP cube 550. The time-series object display 104 includes two dimensions of data, loan status (shown in a status rows 106) and loan servicer (shown in servicer columns 108). The loan statuses shown in the time-series object display 104 include current, PD30 (past due 30 days), PD60 (past due 60 days), and PD90+ (past due 90 days or more). The loan servicers shown in the time-series object display 104 include servicers A, B, and C. For each combination of dimensions (loan statuses and loan servicers), a time-series object has been returned and/or outputted by the time-sensitive cube data system. The returned time-series objects include loan amount metrics. The loan amount metrics shown include, as indicted by the applied formula of indicator 109 (e.g., sum(Loan Amounts)), aggregated or summed loan amounts over all loans in each of the various combinations of dimensions. Further, indication 109 shows that the time period displayed includes the past 4 months. Thus, the user may view, for example, time-series object 110 which indicates the aggregated loans amounts (total value of loans) that are (or were current), serviced by servicer A, over time.

As indicated by the time-series object 110 of the time-series object display 104 of FIG. 1, the total value of loans that are or were current, serviced by servicer A, have increased over time. In contrast, the total value of loans that are past due 30 days or past due 90 days for servicer A have decreased overtime. The total value of loans that are past due 90 days or more for servicer A have remained relatively constant. Similar types of observations may be made with respect to servicers B and C.

In an embodiment, the various time series shown in time-series object display 104 have a common or proportionate scale, such that the magnitude of the data displayed may be accurately compared. For example, in time-series object display 104, at the beginning of the displayed 4 month period, for servicer A, the total value of current loans serviced was approximately twice the total value of PD30 loans serviced. In another embodiment, each of the various time series may be scaled individually.

In an embodiment of the user interface 102 of FIG. 1, the user may select and/or rollover the displayed time-series objects to view more detailed information. For example, when the user rolls over and/or selects the time-series object at rollover location 112, a popup is displayed indicating detailed information related to that point in the time-series object. In this example, the popup indicates that in June, the total value of loans serviced by servicer B and PD90+ was $500,000. In other embodiments, detailed information may be provided in other ways. For example, the information provided may be more or less detailed, may be shown in a separate display and/or in a different location on the display, among others.

In an embodiment, the user may select a time-series object and view an expanded view of object, as shown in time-series object expanded view 114. The time-series object expanded view 114 shows a larger version of the time-series object outputted for PD30 loans of servicer C. In the time-series object expanded view 114 the user may view, for example, tick marks on the graph indicating months and total loan value. In an embodiment, the user may rollover and/or select various items of the time-series object expanded view 114 to view additional and/or more detailed information. In an embodiment, each of the outputted time-series objects of time-series object display 104 may display and/or include additional details and/or information as indicated in the time-series object expanded view 114.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Expression: A sequence of characters which may be interpreted or evaluated by a computer. To "evaluate" an expression means to perform the computation that the expression specifies and to return the result of that computation. The returned result is referred to as the "value" or the "output" of the expression. Expressions may also be referred to as formulas. Expressions and/or formulas may be applied to time series and/or time-series objects to produce new outputs.

Operation: Similar to an expression, an operation is an action or procedure which produces a new output from one or more inputs. The terms operation, expression, and/or formula may be used interchangeably in the present disclosure, however, for the sake of clarity, the term "operation" is generally used in reference to manipulations of an OLAP cube.

Time Series: A mapping from timestamps to data values. The data values in a time series are measured and/or recorded at date-time points that are represented by the timestamps. Expressions may be applied to time series and/or a combination of multiple time series. Time series are a type of data object, and thus time series may be referred to herein as time-series objects, time-series data objects, time-sensitive objects, and/or time-sensitive data objects. In some embodiments, an object time series is a time series in which timestamps are mapped to objects, rather than just data values. Expressions may also be applied to object time series and/or a combination of multiple object time series.

Online Analytical Processing (OLAP) Cube: A group of data cells and/or database items arranged according to the dimensions of the data. When the data includes three or more dimensions, the data may be visualized as a cube or hypercube in which each dimension forms a side of the cube. Example dimensions may include measures, metrics, products, geographical regions, and sales channels, among others. The data of an OLAP cube is organized such that the OLAP cube may be manipulated and operated upon in various ways such that a user may rapidly extract relevant data. Examples of typical operations include, but are not limited to, drill up and down, roll up, roll down, pivot, and slice and dice, among others. OLAP cubes may also be referred to herein as multi-dimensional databases, cubes, and/or hypercubes.

Time-sensitive OLAP Cube: An OLAP cube in which the data (including the metrics and/or dimensions) of the cube include time-series data objects. A time-sensitive OLAP cube may be operated upon in the same or similar manner as an OLAP cube may be operated upon. However, in contrast to a typical OLAP cube, a time-sensitive OLAP cube outputs time-series objects to which further expressions may be applied. A time-sensitive OLAP cube may also be referred to herein as a time-sensitive cube, a time-series OLAP cube, and/or a time-series cube.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
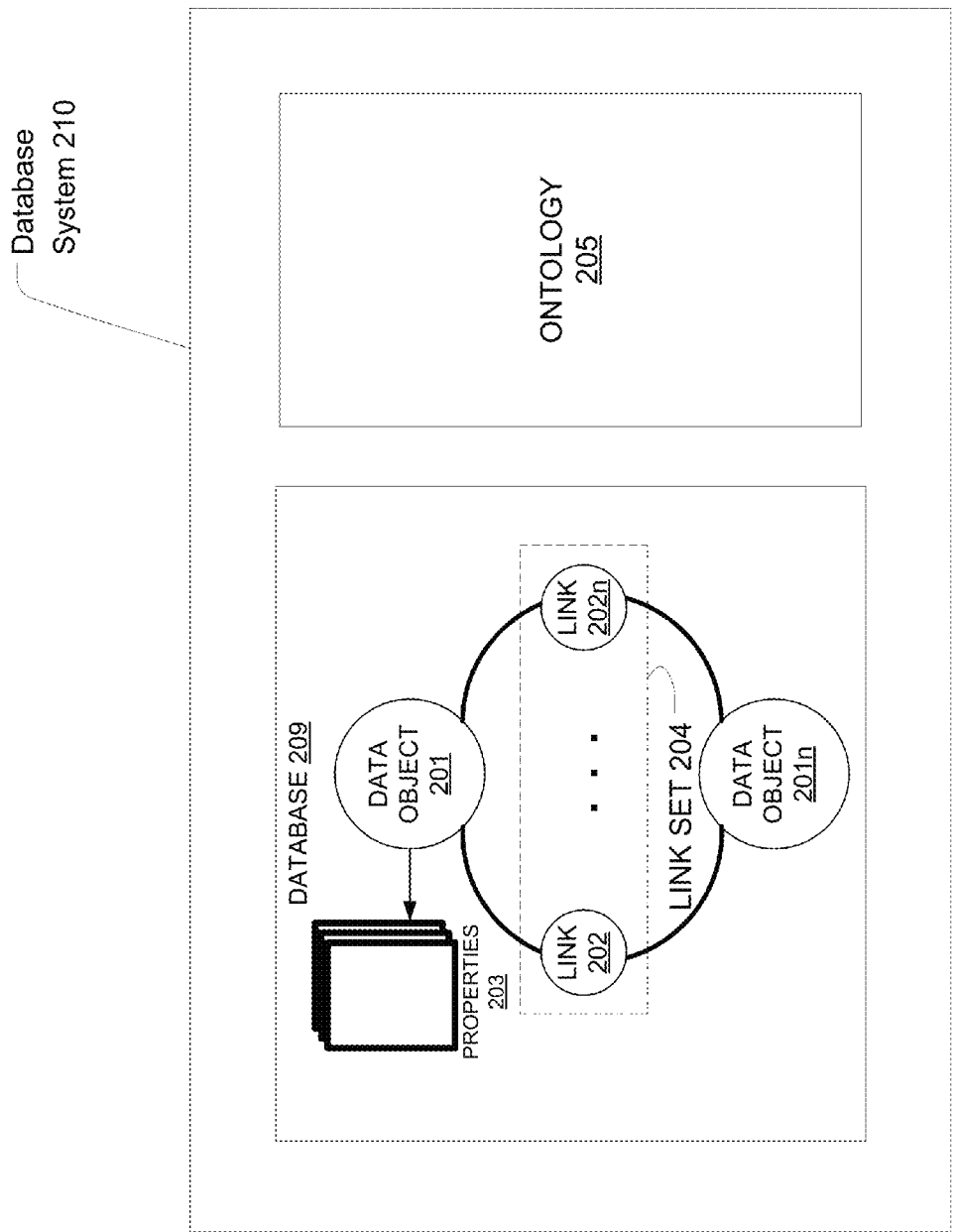
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Various exemplary components and data may be used in identifying and storing data according to an ontology. In an example, the ontology may be configured, and data in the data model populated, by a system of parsers and ontology configuration tools. In an embodiment, input data is provided to parser. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser is able to read a variety of source input data types and determine which type of data it is reading.

In accordance with the discussion above, the example ontology 205 comprises stored information providing the data model of data stored in database 209, and the ontology is defined by one or more object types, one or more property types, and one or more link types. Based on information determined by the parser or other mapping of source input information to object type, one or more data objects 201 may be instantiated in the database 209 based on respective determined object types, and each of the objects 201 has one or more properties 203 that are instantiated based on property types. Two data objects 201 may be connected by one or more links 202 that may be instantiated based on link types. The property types each may comprise one or more data types, such as a string, number, etc. Property types may be instantiated based on a base property type. For example, a base property type may be "Locations" and a property type may be "Home."

In an embodiment, a user of the system uses an object type editor to create and/or modify the object types and define attributes of the object types. In an embodiment, a user of the system uses a property type editor to create and/or modify the property types and define attributes of the property types. In an embodiment, a user of the system uses link type editor to create the link types. Alternatively, other programs, processes, or programmatic controls may be used to create link types and property types and define attributes, and using editors is not required.

In an embodiment, creating a property type using the property type editor involves defining at least one parser definition using a parser editor. A parser definition comprises metadata that informs parser how to parse input data to determine whether values in the input data can be assigned to the property type that is associated with the parser definition. In an embodiment, each parser definition may comprise a regular expression parser or a code module parser. In other embodiments, other kinds of parser definitions may be provided using scripts or other programmatic elements. Once defined, both a regular expression parser and a code module parser can provide input to parser to control parsing of input data.

Using the data types defined in the ontology, input data may be parsed by the parser to determine which object type should receive data from a record created from the input data, and which property types should be assigned to data from individual field values in the input data. Based on the object-property mapping, the parser selects one of the parser definitions that is associated with a property type in the input data. The parser parses an input data field using the selected parser definition, resulting in creating new or modified data. The new or modified data is added to the database 209 according to ontology 205 by storing values of the new or modified data in a property of the specified property type. As a result, input data having varying format or syntax can be created in database 209. The ontology 205 may be modified at any time using object type editor, property type editor, and link type editor, or under program control without human use of an editor. Parser editor enables creating multiple parser definitions that can successfully parse input data having varying format or syntax and determine which property types should be used to transform input data into new or modified input data.

The properties, objects, and the links (e.g. relationships) between the objects can be visualized using a graphical user interface (GUI). In addition to visually showing relationships between the data objects, the user interface may allow various other manipulations. For example, the objects within database 108 may be searched (e.g., text string matching of object properties), inspected (e.g., properties and associated data viewed), filtered (e.g., narrowing the universe of objects into sets and subsets by properties or relationships), and/or statistically aggregated (e.g., numerically summarized based on summarization criteria), among other operations and visualizations.

Time-Sensitive OLAP Cube

Figure 3:
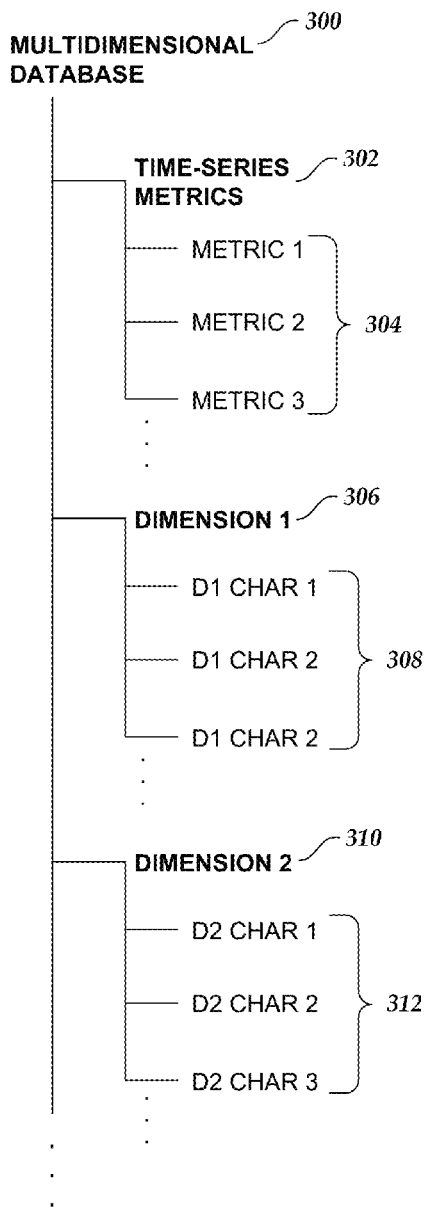
FIGS. 3 and 4 illustrate an example multidimensional database structure of the time-sensitive cube data system, according to an embodiment of the present disclosure.

FIG. 3 illustrates an example multidimensional database structure 300 of the time-sensitive cube data system, according to an embodiment of the present disclosure. The multidimensional database structure of FIG. 3 may also be referred to as an OLAP cube, or an OLAP cube database. The multidimensional database structure 300 advantageously includes one or more time-series objects that may be output by the time-sensitive cube data system when operations are performed by a user.

The multidimensional database structure 300 of FIG. 3 includes time-series metrics 302, dimension one 306, and dimension two 310. In an embodiment, the multidimensional database structure 300 may include more or fewer time-series metrics and/or dimensions than is shown in FIG. 3. The time-series metrics 302 include multiple metrics 304. In this embodiment, each of the metrics 304 is a time-series object, meaning that each metric of the multidimensional database structure 300 includes a mapping from timestamps to data values and/or objects, and/or the metric may be modeled as a time series. In an embodiment, one or more of the time-series metrics 302 may be time-series objects, while one or more may be simple values or other types of data. Additionally, in FIG. 3, each of dimensions 306 and 310 includes multiple dimension characteristics (308 and 312, respectively). In an embodiment, dimensions 306 and 310 may include more and/or fewer characteristics than is shown in FIG. 3. In an embodiment, the dimension characteristics 308 and 310 may be organized in a hierarchical structure, including, for example, sub-characteristics, sub-sub-characteristics, etc. In an embodiment, dimension 306 and/or dimension 310 may include objects, time-series objects, and/or other types of data or labels. In an embodiment, characteristics of a dimension may be referred to as values.

Advantageously, the multidimensional database structure 300 is organized such that it may be used in the time-sensitive cube data system and enable rapid responses to multidimensional queries and operations. Further, the responses and/or outputs of queries to the time-sensitive cube data system may include time-series objects, to which further expressions and/or statistical analysis may be applied. Thus, time-sensitive metrics and/or statistics may be extracted from the time-sensitive cube data system.

FIG. 4 illustrates an example multidimensional database 400 of the time-sensitive cube data system having a structure analogous to the multidimensional database structure 300 of FIG. 3, according to an embodiment of the present disclosure. The loans multidimensional database 400 contains information that may be relevant to, for example, lenders (such as a bank or other mortgage lender). The description of the multidimensional database structure 300 provided above in reference to FIG. 3, applies equally to the example loans multidimensional database 400 of FIG. 4.

In the example multidimensional database 400 of FIG. 4, time-series metrics 402 include time-series metrics/objects 404 including: Loan Amount (e.g., the value of a loan or group of loans), Unpaid Balance (e.g., the unpaid balance on a loan or group of loans), and Risk of Default (e.g., the risk that one or more debtors will default on a loan or group of loans). In this embodiment, each of the time-series metrics/objects 404 comprise metrics or measurements that may be relevant to a lender in assessing their portfolio of loans, and each comprises a time-series object (meaning that the value of each varies with time). For example, the Loan Amount associated with a group of loans of the lender varies with time as new loans are underwritten, and/or other loans are paid off. Similarly, the Unpaid Balance associated with a group of loans varies with time as debtors make payments on their loan balances and/or new loans are underwritten. The Risk of Default may also vary with time as the characteristics associated with the pool off debtors change over time. In an embodiment, more or fewer metrics may be included, one or more of which may or may not be time-sensitive. Examples of other types of data that may be modeled as a time series include, for example, prices, populations, natural phenomena (such as weather), among many others.

Additionally, the loans multidimensional database 400 includes two dimensions: loan status 406 and loan servicer 410. Status 406 has possible status characteristics 408 including Current (e.g., the debtor(s) associated with the loan(s) are current on their payments), PD30 (past due 30), and PD60 (past due 60). Additional statuses may be included in certain embodiments, for example, PD90 and/or PD120. Also, servicer 410 has possible servicer characteristics 412 including A, B, and C. Additional servicers may be included in certain embodiments. In an embodiment, one or more of the dimensions of the time-sensitive cube data system are time-sensitive. In an embodiment, more or fewer dimensions may be included, one or more of which may or may not be time-sensitive. For example, the example loans multidimensional database 400 may include a dimension regarding the region or state in which the loan was originated. In an embodiment, the dimensions of the loans multidimensional database 400 may include a hierarchical arrangement of sub-characteristics, etc., as described above.

FIG. 5 illustrates an example visual representation or logical structure of the example loans multidimensional database 400 of the time-sensitive cube data system, according to an embodiment of the present disclosure. The visual, cube-like, representation of FIG. 5 is referred to as a time-sensitive OLAP cube 550. Three dimensions of data are represented in the time-sensitive OLAP cube 550: servicer 410, status 406, and state 552. The state dimension 552 includes characteristics CA (California), FL (Florida), and IL (Illinois), while the servicer 410 and status 406 dimensions include values as described above with reference to FIG. 4.

The dimensions of the example time-sensitive OLAP cube 550 serve as indices for identifying values and/or objects within the cube. Operations may be performed on the cube by selecting values and/or ranges of values of one or more dimensions. Examples of typical operations include, but are not limited to, drill up and down, roll up, roll down, pivot, and slice and dice, among others. For example, value and/or object 554 may be selected by specifying servicer C, status PD90, and state CA. Selecting one member of a dimension results in a sub-cube (in which the number of dimensions is reduced by one) comprising the remaining dimensions. Selecting all but two dimensions results in a slice (or page) of the cube. This may be seen with user selection 554, in which a single value (CA) of the state dimension 552 is selected, resulting in slice of two-dimensions (servicer 410 and status 406). The results of such a slice may be seen in, for example, the user interface of FIG. 1.

Advantageously, each cell of the time-sensitive OLAP cube 550 may represent a time-series object. When operations are performed on the time-sensitive OLAP cube 550, one or more time-series objects are output, which may then be further visualized and analyzed. Generally, time-sensitive OLAP cubes may have hierarchies or formula-based relationships of data within each dimension. Operations on the cube may result in consolidation in which data relationships for one or more dimensions are computed. For example, instead of slicing 554, a user may consolidate all the data across the state dimension 552, resulting in two dimensions of data including all states. As mentioned above, other OLAP cube operations (including, for example, drill up and down, roll up, pivot, dice, etc.) may be performed on the time-sensitive OLAP cube 550 to produce time-sensitive outputs.

Turn now back to FIG. 1 described above, an example of one possible set of results of the user selection 554 is shown. Specifically, two dimensions of data are represented in the time-series object display 104 of the user interface 102: status 106 and servicer 108. As indicated at 109, regarding the third dimension of data (state) only California is represented. Alternatively, the user may have chosen to view data related to only Florida or Illinois, or any combination of the state dimension. Alternatively, the user may have sliced the cube in any other way, and/or performed any other operation on the cube.

In an embodiment, after an operation has been performed on the cube, and time-series objects have been outputted (as shown in the small graphs of the time-series object display 104, e.g., time-series object 110), the user may optionally specify a particular time period of interest. In the time-series object display 104 of FIG. 1, the user has specified the past 4 month (see indicator 109), however the user may have specified any other time frame and/or period. For example, in an embodiment the user may specify a number of months or years, a number of minutes or hours, a number of seconds, a particular range of time periods, and/or a single point in time, among others. For example, in an embodiment the user may specify a single point in time, resulting in an output of a single value calculated from the time-series data object (rather than a graph of values).

In an embodiment, the user may apply a formula or expression (and/or other statistical analysis) to the time-series objects output by the time-sensitive cube data system. Indicator 109 demonstrates one such example expression, namely "sum(Loan Amount)." The expression of indicator 109 causes the time-sensitive cube data system to sum or aggregate the total loan value of loans within the respective dimensions, for every point in time, and graph the result for the 4 month time period specified. Alternatively, the user may indicated an expression that may result in a single value from a single day, for example, "sum(Loan Amount).time('Jan 4')." In an embodiment, the user may apply an expression incorporating multiple time-sensitive metrics. For example, the user may apply the expression, "sum(Unpaid Balance×Risk) .overtime," producing a time-series graph showing a weighted risk indicator over time. In an embodiment, an expression may include any number of mathematical operations, for example, a moving average, etc.

Figure 7:
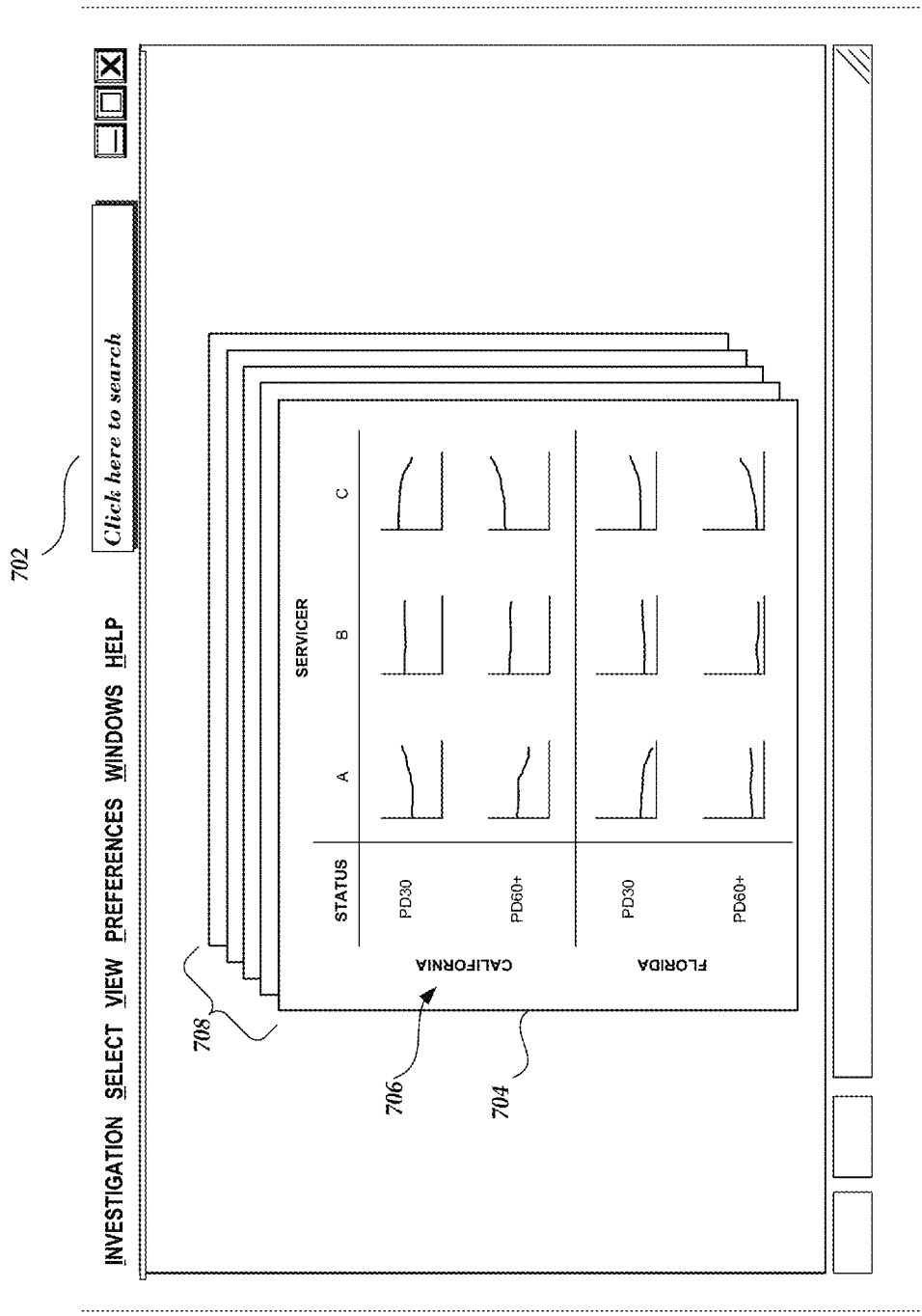
FIG. 7 illustrates another user interface of a time-sensitive cube data system, according to an embodiment of the present disclosure.

FIG. 7 illustrates an alternative user interface 702 of the time-sensitive cube data system, according to an embodiment of the present disclosure. In the user interface 702 of FIG. 7 a time-series object display 704 is shown with three dimensions of data. In particular, in addition to the two dimensions shown in time-series object display 104 of FIG. 1, at least two values of the state dimension 706 are shown in the time-series object display 704. The time-series object display 704 shows time-series object outputs for each of California and Florida, for two other dimensions of data (status and servicer). In an embodiment, the user may optionally scroll the time-series object display 704 up to view additional values of the state dimension 706. In another embodiment, the user interface 702 may include layers 708, each of which may be accessible to the user, and each of which may display time-series objects related to a different value of a particular dimension of data. For example, in an embodiment, the user may select various of the layers 708 to view status and servicer time-series object outputs for each of the different states. In an embodiment, the user may slice the time-sensitive OLAP cube such that the user interface shows different dimensions of data than those shown in either of FIG. 1 or 7. For example, the user may desire to view time-series object output associated with servicers vs. states, among other possibilities.

The loan multidimensional database example of the preceding description is only one example of an application of the time-sensitive cube data system. However, the time-sensitive cube data system may be applied to any data analysis problem. For example, the time-sensitive cube data system may be used to visualize and analyze customer data, shipping data, purchase data, personnel data, among other types of data.

Figure 6:
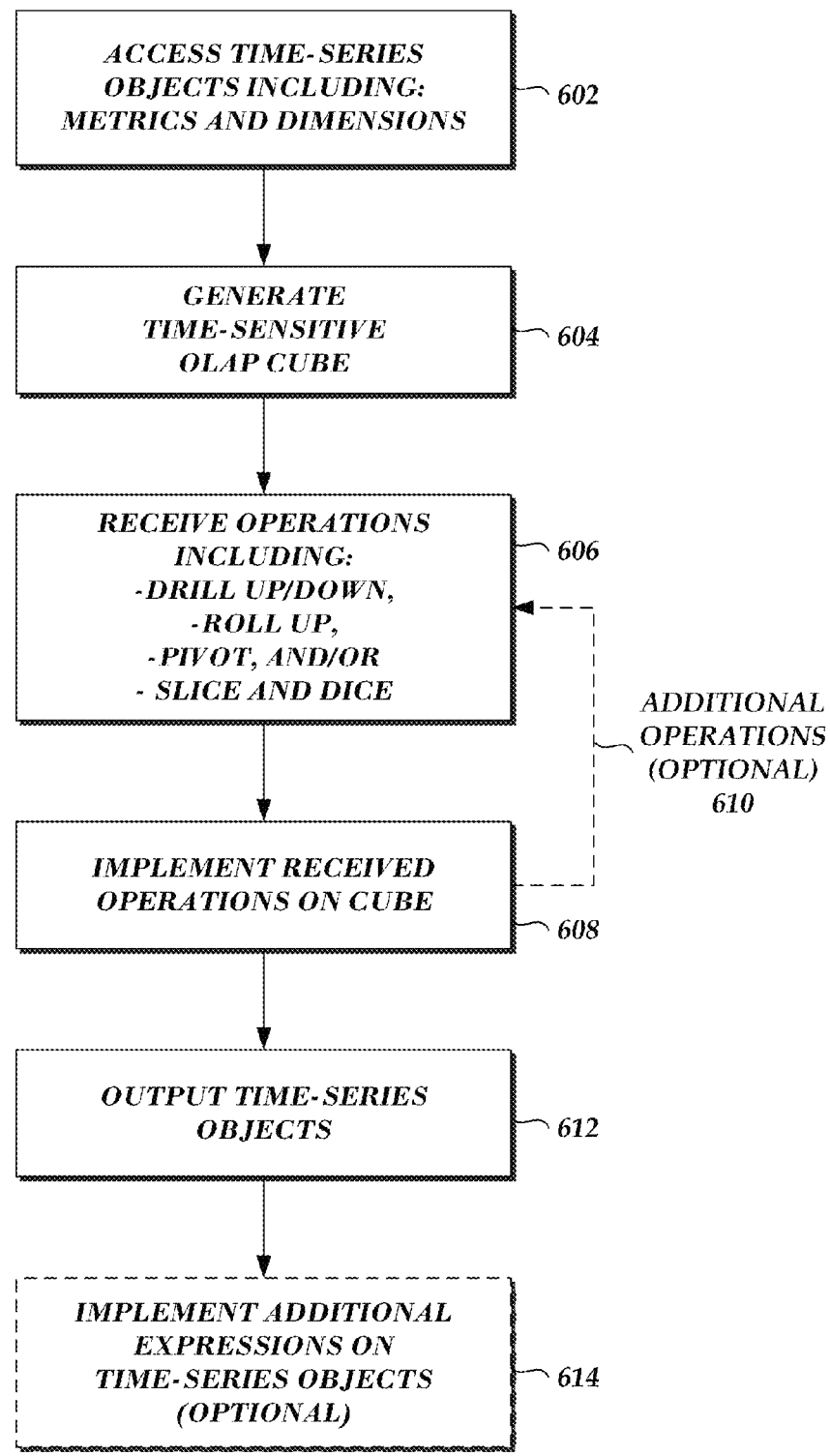
FIG. 6 is a flowchart depicting an illustrative operation of the time-sensitive cube data system, according to an embodiment of the present disclosure.

FIG. 6 is a flowchart depicting an illustrative operation of the time-sensitive cube data system, according to an embodiment of the present disclosure. In various embodiments, fewer blocks or additional blocks may be included in the process, or various blocks may be performed in an order different from that shown in FIG. 6.

At block 602, the time-sensitive cube data system accesses time-series objects from the multidimensional database, including metrics and dimensions (as described above in reference to FIGS. 3 and 4). Then, at block 604, the time-sensitive cube data system generates the time-sensitive OLAP cube from the accessed metrics and dimensions (as described above with reference to the FIG. 5).

At block 605, the time-sensitive cube data system may receive operations from the user with respect to the generated time-sensitive OLAP cube. For example, any of the operations described above may be received, including, but not limited to: drill down and up, roll up, roll down, pivot, and/or slice and dice. Next, at block 608, the operation is implemented on the cube, as described above. For example, the cube may be sliced according to user selection 554 as shown in FIG. 5. Then, the user may optionally provide additional operations 610 that may also be implemented on the cube.

At block 612, the time-sensitive cube data system outputs the time-series objects as defined by the operations implemented on the cube. Examples of such outputs are shown in FIGS. 1 and 7, and described in reference to those figures. Additionally, at block 614 the time-sensitive cube data system may optionally implement additional expressions and/or operations on the outputted time-series objects. Example of such expressions and/or operations are described above in reference to FIG. 1. In particular, a user may specify particular time periods or ranges of interest, and/or may specify formulas to be applied to the time-series metrics.

In an embodiment, the time-sensitive cube data system may include an integrated user interface though which the user may manipulate the time-sensitive OLAP cube, for example, an interface that provides a view as shown in FIG. 5. In an embodiment, the time-sensitive cube data system may automatically generate a time-sensitive OLAP cube and/or a time-series object display (such as time-series object display 104) from a user selection on an alternative data display, such as graph representation 403. For example, in an embodiment, the may select data items and/or drag-and-drop items on the graph representation 403 and the time-sensitive cube data system may then automatically produce the time-sensitive OLAP cube 550 of FIG. 5 and/or the time-series object display 104 of FIG. 1.

In an embodiment, the time-sensitive OLAP cube 550 of FIG. 5 includes data for a single point in time (a snapshot), but may be slid over time (e.g., updated over time) to include data for any point in time. In this embodiment, sliding the cube over time is possible because the underlying data of the multidimensional database are modeled as time series.

In an embodiment, the time-series object display 104 of FIG. 1 may include, to the right of the servicer C column, a summary column that automatically accumulates the results from the columns to the left and shows a cumulative time-series graph of data. In an embodiment, the time-sensitive cube data system may output data to a spreadsheet application (and/or other application or format), where it may be interpreted and manipulated further by the user.

Implementation Mechanisms

According to one embodiment, the techniques described herein are implemented by one or more special-purpose computing devices, such as the time-sensitive cube data system that is discussed herein. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
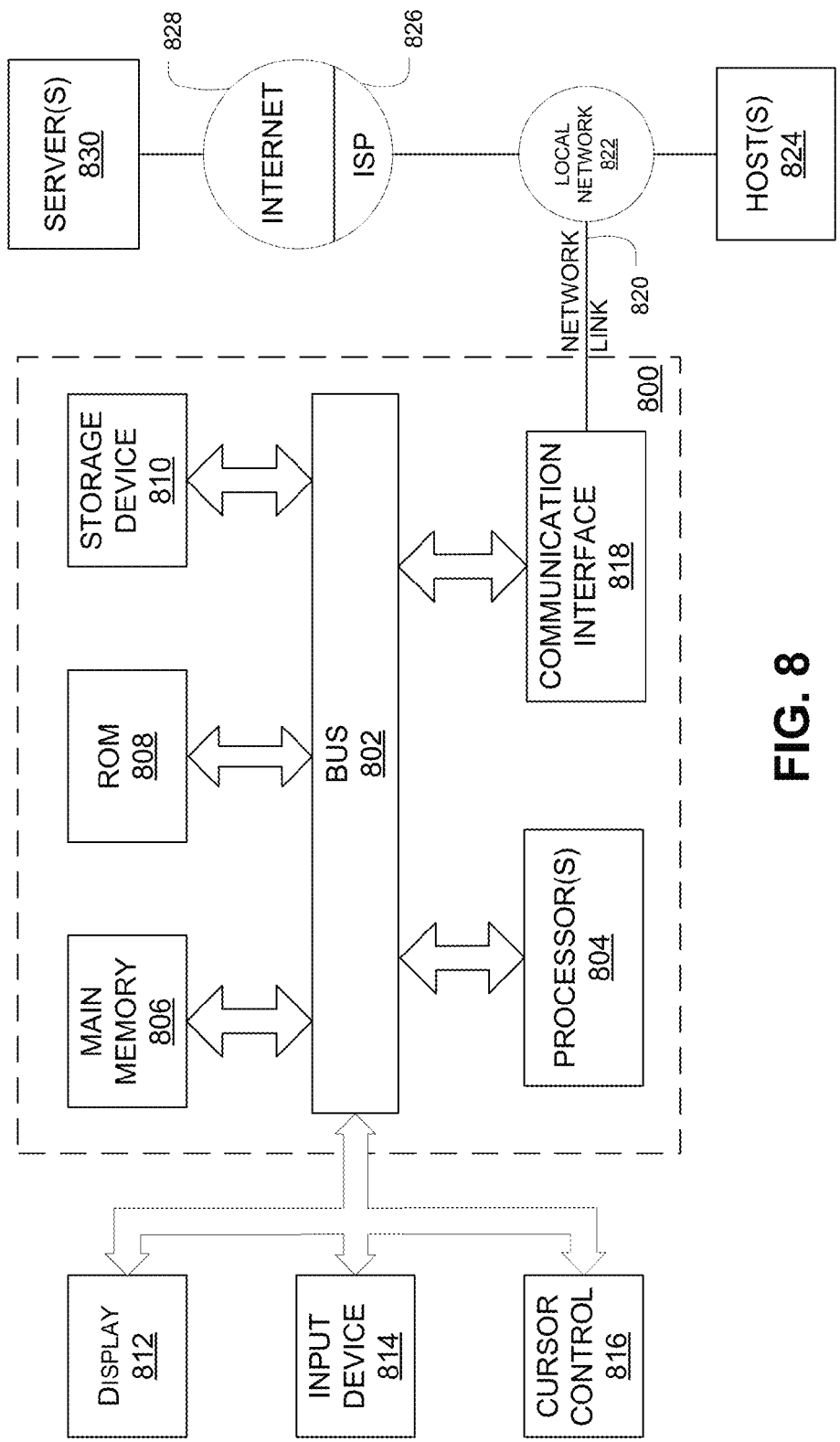
FIG. 8 illustrates a computer system with which certain methods discussed herein may be implemented.

For example, FIG. 8 is a block diagram that illustrates a computer system 800 upon which systems and methods discussed herein may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In an embodiment, the time-sensitive cube data system is implemented by the computer system 800. For example, time-series data objects may be stored in the storage device 810, and/or in an external database accessible through the local network 822. The user interfaces and/or operations of the time-sensitive cube data system may be implemented by modules stored in the main memory 806, the ROM 808, and/or the storage device 810, and executed by the processor(s) 804. For example, the computer system 800 may include a user interface module and OLAP cube analysis module, among others.

Advantageously, the time-sensitive cube data system provides a time-sensitive OLAP cube which may be manipulated by a user, and which outputs time-series data objects that may be further operated upon and analyzed. The time-series objects output by the time-sensitive cube data system are more helpful than a single snapshot, as a user is able to see data trends over time. The time-sensitive and/or time-series data objects output by the time-sensitive cube data system may be displayed to the user in any way that may be advantageous to the user's understanding. The time-sensitive multidimensional database structure of the time-sensitive cube data system advantageously includes one or more time-series objects that may be output by the time-sensitive cube data system when operations are performed by a user. Further, the multidimensional database structure is organized such that it may be used in the time-sensitive cube data system and enable rapid responses to multidimensional queries and operations. Additionally, advantageously, each cell of the time-sensitive OLAP cube may represent a time-series object. Further, because data is modeled as a time series in the time-sensitive cube data system, further computations may be accomplished more efficiently by computing over the entire time series instead of sampling one point at a time, as may have been done previously. Expressing the computations as related to time series allows the computations to be reused across multiple calculations.

Additional Implementation Details

In an embodiment, all pieces of a Cube computation might depend on a valueOn date.

In an embodiment, the Cube system may not evaluate the starting universe on multiple dates. Instead it may evaluate it once at the beginning of the computation, with the valueOn date defined in the context in which the compute function is invoked. To implement time-varying starting universe the system may rely on the Cube system's filterBy metric, which may handle multiple valueOn dates properly.

In an embodiment, for Filter/groupBy/aggregateBy Metrics, each metric may be evaluated in one of two ways: (1) If the metric return type is a TimeSeries/ObjectTimeSeries, the Cube system may evaluate it once and sample the resulting *Series on the required dates. (2) If the metric return type is anything else, the Cube system may assume it is time-sensitive and evaluate it on the required dates. If the user wants a CM to be evaluated only once (because it has expensive CM logic), they may return a single-point ObjectTimeSeries.

In an embodiment, regarding Cube.computeOn(DateSet d), instead of invoking Cube.compute to obtain a regular CubeResult for a single date, users may invoke Cube.computeOn(DateSet) metric to efficiently compute the same Cube over multiple dates.

In an embodiment, regarding CubeResult, CubeResults returned by Cube.computeOn(DateSet) may have the same type as regular CubeResults. The only difference may be that all aggregates return a TimeSeries instead of a Number. TimeSeries returned by CubeResult may have a point on every date in the given DateSet. When an aggregate value cannot be computed (because, for example, there were no items for that specific key in that date) then NaN may be used as a placeholder.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method of providing multidimensional time series objects to a user, the method comprising:
    providing an electronic database configured to store a plurality of time-series metric objects and a plurality of dimension objects, each of the plurality of time-series metric objects including a plurality of values associated with corresponding times;
    generating, by a computing system including one or more hardware computer processors, based at least in part on the plurality of time-series metric objects and the plurality of dimension objects, a time-sensitive OLAP cube;

receiving, via an input device of the computing system, an operation from a user comprising a selection of at least two of the plurality of dimension objects;

determining, by the computing system, based on the received operation, a plurality of relevant time-series metric objects associated with each of the selected dimension objects; and providing to the user, on an electronic display of the computing system, a table comprising a plurality of rows corresponding to values of at least one of the selected dimension objects, a plurality of columns corresponding to values of at least one other of the selected dimension objects, and cells associated with each combination of the rows and columns, each cell including one of the plurality of relevant time-series metric objects associated with respective row and column values, each one of the plurality of relevant time-series metric objects provided as a two-dimensional graph indicating a historical trend configured for comparison with other ones of the plurality of relevant time-series metric objects associated with other combinations of row and column values, wherein a first dimension of each of the two-dimensional graphs is a time dimension having a common scale and a common interval among the two-dimensional graphs, and a second dimension of each of the two-dimensional graphs has another common scale and another common interval among the two-dimensional graphs.

2. The computer-implemented method of claim 1, wherein each of the plurality of dimension objects includes one or more characteristics.

3. The computer-implemented method of claim 2, wherein the one or more characteristics are structured hierarchically.

4. The computer-implemented method of claim 2, wherein the received operation further comprises a selection of at least one of the one or more characteristics.

5. The computer-implemented method of claim 1 further comprising:
providing, on the electronic display of the computing system, an interface configured to allow the user to manipulate the time-sensitive OLAP cube and provide operations.

6. The computer-implemented method of claim 1 further comprising:
receiving an expression from the user; and
applying the received expression to the plurality relevant time-series metric objects.

7. A computer system comprising:
one or more hardware processors in communication with a computer readable medium storing software modules including instructions that are executable by the one or more hardware processors in order to cause the computer system to:
access, from an electronic data store, a plurality of time-sensitive objects including measures and dimensions, each of the plurality of time-sensitive objects including a plurality of values associated with corresponding times;
generate, based at least in part on the accessed plurality of time-sensitive objects, a time-sensitive OLAP cube;
receive one or more OLAP operations including a selection of at least two dimensions of the time-sensitive OLAP cube; and
apply the received one or more OLAP operations to the time-sensitive OLAP cube and output calculated time-sensitive objects in a user interface based at least in part on the OLAP operations, wherein the user interface includes at least a table comprising a plurality of rows corresponding to values of at least one of the selected at least two dimensions, a plurality of columns corresponding to values of at least one other of the selected at least two dimensions, and cells associated with each combination of the rows and columns, each cell including one of the calculated time-sensitive objects associated with respective row and column values, each one of the calculated time-sensitive objects provided as a two-dimensional graph indicating a historical trend configured for comparison with other ones of the calculated time-sensitive objects associated with other combinations of row and column values, wherein a first dimension of each of the two-dimensional graphs is a time dimension having a common scale and a common interval among the two-dimensional graphs, and a second dimension of each of the two-dimensional graphs has another common scale and another common interval among the two-dimensional graphs.

8. The computer system of claim 7, wherein the software modules are further executable by the one or more hardware processors in order to cause the computer system to:
output, on an electronic display, the user interface.

9. The computer system of claim 7, wherein at least one of the measures is time-sensitive.

10. The computer system of claim 7, wherein each dimension includes one or more characteristics.

11. The computer system of claim 10, wherein the one or more characteristics are structured hierarchically.

12. The computer system of claim 10, wherein the one or more OLAP operations further includes a selection of at least one of the one or more characteristics.

13. The computer system of claim 7, wherein the software modules are further executable by the one or more hardware processors in order to cause the computer system to:
provide a computer interface configured to allow a user to manipulate the time-sensitive OLAP cube and provide OLAP operations.

14. The computer system of claim 7, wherein the software modules are further executable by the one or more hardware processors in order to cause the computer system to:
apply one or more mathematical expressions to the calculated time-sensitive objects.

15. The computer system of claim 7, wherein the one or more OLAP operations include at least one of drill up, drill down, roll up, pivot, slice, or dice.

16. A computer system comprising:
an electronic database configured to store a plurality of time-series objects and a time-series OLAP cube based at least in part on one or more of the plurality of time-series objects, each of the plurality of time-series objects including a plurality of values associated with corresponding times; and
one or more hardware processors in communication with the electronic database and a computer readable medium storing software modules including instructions that are executable by the one or more hardware processors in order to cause the computer system to:
access the stored time-series OLAP cube;
present, on an electronic display, the time-series OLAP cube;

receive user-provided indications of operations to be applied to the presented time-series OLAP cube, the indication of operations including a selection of at least two dimensions of the time-sensitive OLAP cube;

apply operations corresponding to the user-provided indications to the time-series OLAP cube so as to determine at least a plurality of relevant time-series objects; and present to a user, on the electronic display, determined time-series objects based at least in part on the applied operations, a table comprising a plurality of rows corresponding to values of at least one of the selected at least two dimensions, a plurality of columns corresponding values of at least one other of the selected at least two dimensions, and cells associated with each combination of the rows and columns, each cell including one of the plurality of relevant time-series objects associated with respective row and column values, each one of the plurality of relevant time-series objects provided as a two-dimensional graph indicating a historical trend configured for comparison with other ones of the plurality of relevant time-series objects associated with other combinations of row and column values, wherein a first dimension of each of the two-dimensional graphs is a time dimension having a common scale and a common interval among the two-dimensional graphs, and a second dimension of each of the two-dimensional graphs has another common scale and another common interval among the two-dimensional graphs.

17. The computer system of claim 16, wherein the operations include at least one of drill up, drill down, roll up, pivot, slice, or dice.

\* \* \* \* \*